July 23, 1968    E. WASSMANN ETAL    3,393,637
STENCILS FOR LETTERING AND THE LIKE AND METHOD AND
TOOL FOR MANUFACTURING SUCH STENCIL
Filed Feb. 16, 1965    2 Sheets-Sheet 1

Inventors
EDGAR WASSMANN
HARALD KOELICHEN
By
OSTROLENK, FABER, GERB & SOFFEN
ATTORNEYS July 23, 1968  E. WASSMANN ET AL  3,393,637
STENCILS FOR LETTERING AND THE LIKE AND METHOD AND
TOOL FOR MANUFACTURING SUCH STENCIL
Filed Feb. 16, 1965  2 Sheets-Sheet 2

*Inventors*
EDGAR WASSMANN
HARALD KOELICHEN
By
OSTROLENK, FABER, GERB & SOFFEN
ATTORNEYS

United States Patent Office 3,393,637
Patented July 23, 1968

3,393,637
STENCILS FOR LETTERING AND THE LIKE AND METHOD AND TOOL FOR MANUFACTURING SUCH STENCIL
Edgar Wassmann and Harald Koelichen, Geretsried, Upper Bavaria, Germany, assignors to Filler & Fiebig G.m.b.H., Geretsried, Upper Bavaria, Germany, a corporation of Germany
Filed Feb. 16, 1965, Ser. No. 432,978
Claims priority, application Germany, Feb. 20, 1964, F 42,069
8 Claims. (Cl. 101—127.1)

The invention relates to a stencil for lettering or signs, made by injection molding processes from a transparent synthetic resin and provided along its longitudinal edges with guide strips. Such lettering stencils are used, for example, in construction and drawing offices as drawing aids in conjunction with special tubular pens.

Hitherto, the manufacture of stencils of this kind has been expensive and complex, in view of the fact that the lettering had to be machined out by means of engraving milling machines and the guide strips were affixed in a special and distinct operation.

More recently, such stencils have been manufactured by injection-molding; this saves the expensive milling of the lettering in the stencil and permits it at the same time to form the profile of the stencil in such a manner that reinforced or thicker ribs are formed by the synthetic resin itself along the longitudinal edges of the stencil, and these ribs serve as guide strips.

The invention is based on the experience that the guide strips formed in this manner have substantial disadvantages as compared with the metal guide strips fitted to milled stencils. Stencils injection-molded from plastics in one piece with their guide strips have not the stiffness which is necessary especially for large stencils. They are far less resistant and the sliding properties along the paper and along the guide rule are not as good by far as those of metal guides.

Moreover, the burr forming during the separation of the molds also presents a very undesirable feature with extruded guide strips. This burr is usually located in the centre of the guide edge of the strip and has an unfavourable effect on the finished letter or sign, since it cannot be measurably defined.

According to the invention, these aforementioned disadvantages may be eliminated in an injection-molded synthetic resin stencil by incorporating metal guide strips during the extruding. This construction maintains on the one hand the advantages of metal strips, namely stiffness, smooth and easily sliding surfaces, colouring, and in the case of strips made from anodized aluminum also a high degree of surface hardness; on the other hand, compared with milled stencils to which such metal strips are fitted, there is the advantage that the effects of unavoidable tolerances in the profile are eliminated, as explained further below.

Naturally, the stencil must be given along its longitudinal edges a suitable profile in cross-section, mating with a corresponding profile of the metal strips so that these parts may interengage reliably. In this case, each guide strip may have a rib with an undercut wedge-shaped, dovetailed or fir-tree shaped profile which is embraced during the extruding by two mating ribs of the profile of the longitudinal edge of the stencil plate. In another possible construction the profile of the longitudinal edge of the stencil plate has an undercut rib which is fitted between two ribs of the guide strips.

In a preferred embodiment of the present invention, the construction is such that each guide strip has three ribs, the center rib being undercut and the side ribs being chamfered in the direction towards the stencil plate, whilst the outer ribs of the strip are spaced at a slightly greater distance from one another than is the distance in the cavity of the closed injection mold, in order to improve the seal therewith.

In this manner, the closing mold presses the lateral ribs of the fitted strips inwardly and a perfect seal is formed between injection mold and strip even if the metal strip varies dimensionally within certain limits.

Further advantages and features of the invention are outlined in the following description of embodiments of the invention, explained in conjunction with the accompanying drawings, and in the claims appended to this description. In the drawings:

Figures 1, 2:
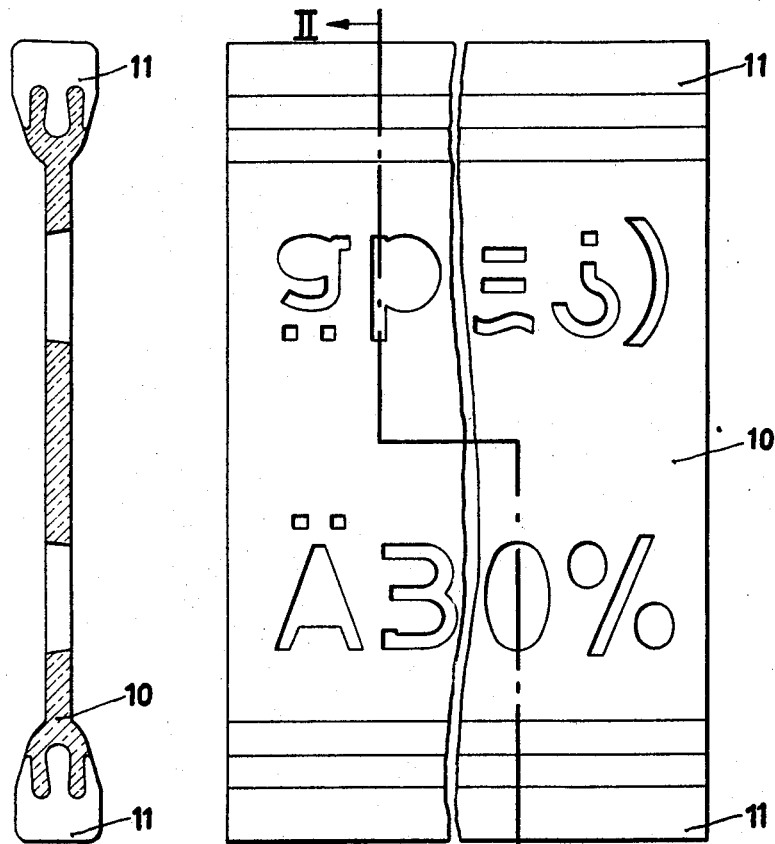
FIG. 1 is a top view of a preferred embodiment of a stencil for lettering or signs according to the present invention.
FIG. 2 is a cross-section along the line II—II in FIG. 1.

The stencil shown in FIGS. 1 in top view and in FIG. 2 in cross-section consists of a stencil plate 10 and two metal strips 11.

As is more clearly apparent from FIG. 3, the said metal strip 11 has three ribs 12, 13a and 13b; the two outermost ribs 13a and 13b (shown by dotted lines) are spaced at a greater distance from each other than is the corresponding inner dimension of the closed parts 16 and 15 of the mold; the reasons for this arrangement will become apparent later. The outer surfaces of the ribs 13a and 13b are chamfered in the direction toward the stencil plate 10 and the center rib 12 is undercut to form a wedge-shaped profile.

Figure 3:
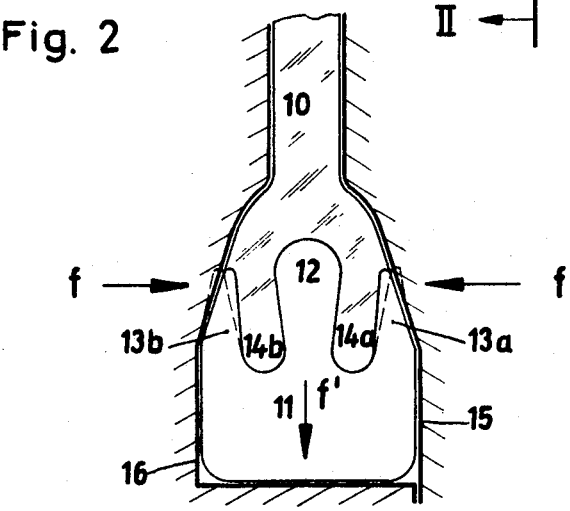
FIG. 3 shows on an enlarged scale a partial cross-section of the stencil of FIGS. 1 and 2 during its manufacture in the injection mold.
Figure 4:
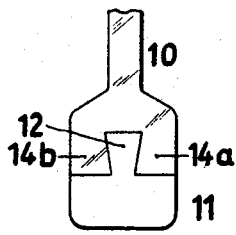
FIGS. 4 to 11 show further embodiments of the joint between the stencil plate and the metal strip.
Figure 5:
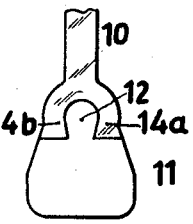

For manufacturing the stencil, the metal strips are placed into the lower mold 16, and the mold is closed, so that the pressure acting in the direction of the arrows f in FIG. 3 and exerted by the two parts 15 and 16 of the mold causes the two outer ribs 13a and 13b to be bent and deformed to assume the shape shown by the full lines in the figure. In order to ensure that the ribs 13a and 13b maintain their slightly bent and on the front edge also slightly deformed shape after the opening of the mold, that is to say, that they do not open up resiliently, the guide strip is made of a kneadable, unelastic metal, such as aluminium or a suitable alloy. Due to the bending and deformation of the outer ribs, these rest firmly against the parts 15 and 16 of the mold, forming a seal therewith, and preventing the liquid synthetic resin material from penetrating during the injection molding between the parts 15, 16 of the mold and the metal strip 11. Since the injection molding process is carried out at pressures of the order of about 2,000 p.s.i., this lateral seal between the ribs 13a or 13b and the mold parts 15 and 16, respectively, is particularly desirable. Since the ribs are chamfered on the outside in the direction towards the stencil plate, the closure of the mold produces simultaneously a force component in the direction of the arrow f' on the base, causing the metal strip to be accurately aligned.

The injection mold has also projections, not shown, which form the recesses in the stencil plate corresponding to the lettering.

The two parts 15, 16 of the mold are separated along the long sides receiving the guide strips, along the upper edges of these guide strips (FIG. 3), whilst the plane of separation of the parts of the molds in conventional designs is located in the plane of symmetry of the stencil.

The stencil manufactured in accordance with the present invention has the special advantage of eliminating the effects of tolerances in the metal strips. As shown by practical experience, certain deviations from the nominal height of the profiles of these metal strips are unavoidable. With known stencils, such as are used, for example, for writing alternatively small letters (or lower case) and capital letters (or upper case) by placing one or the other guide strip against the guide rule, and in which the metal guide strips have been subsequently fitted after the manufacture of the stencil plate, these deviations result in the distance between the bottom edge of the letter in the stencil and the lay side of the associated guide strips to differ on either side of the stencil. These differences in the base lines of the letters result in an untidy and irregular picture of the finished lettering. Moreover, the height of the profile of any one guide strip may also vary over its length. These differences between the base line of the letters and the lay side of the associated guide strip are avoided with the stencil according to the present invention, because the position of both the lay edges of the metal strips (FIG. 3) and the position of the projections corresponding to the lettering are firmly related to the parts 15 and 16 of the mold.

Figure 6:
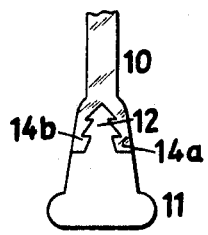
Figure 7:
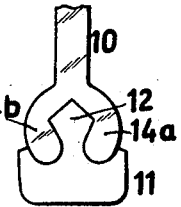
Figure 8:
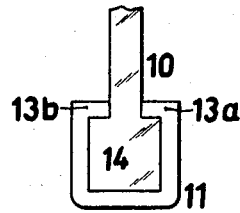
Figure 9:
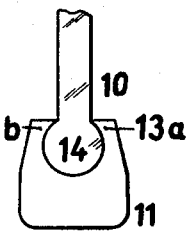
Figure 10:
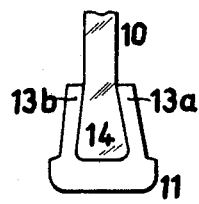
Figure 11:
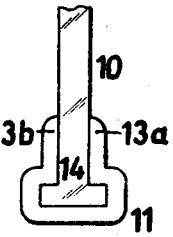

According to the intended application and the materials used for the stencil plate and the metal strips it may be of advantage to select strips with profiles of the kind shown in FIGURES 4 to 11. In FIGURES 4 to 7, the metal strip has only a single rib 12 which is embraced by ribs 14a and 14b of the stencil plate 10, formed during the extruding. Conveniently, the rib 12 is undercut and in some cases a "fir-tree" profile may be preferable, such as shown in FIG. 6.

Furthermore, as shown in FIGURES 8 to 11, the profile of the metal strip may be such that there are two ribs 13a and 13b, respectively, which embrace a rib 14 of the cast stencil plate. As described in conjunction with FIG. 3, in these embodiments the spacing between the ribs may be wider than is their mutual spacing with the injection mold closed. As shown more particularly by the embodiments of FIGURES 3, 9 and 10, the outer surfaces of the ribs 13a and 13b may be provided over a smaller or greater portion of their widths with a chamfer corresponding to a mating chamfer of the parts of the mold.

With another construction of the profile according to FIGURES 3 and 8 to 11 it has become apparent that an "oversize" of about 10 percent of the distance between the outer ribs 13a and 13b is particularly convenient.

The shape of the profile according to FIGURES 3 and 4 to 7 has the main advantage that, owing to the geometrical shape of the rib 12, the shrinking of the stencil material does not produce any slackness between the stencil material and the metal strip, but on the contrary tightens the grip between these parts. The seating of the stencil material 10 around the rib 12 will be the tighter the more the stencil material contracts during the cooling.

Having thus fully disclosed the invention, what is claimed as new and is desired to be secured by Letters Patent is:

1. A stencil for lettering and the like, molded from synthetic resin, wherein metal guide strips are included during the molding; said guide strips and said stencil plate being equipped with longitudinally extending ribs for firmly interconnecting these parts; each guide strip being equipped with three ribs; the center rib of said three ribs being undercut and the outer surfaces of the outer ribs being chamfered in a direction toward said stencil plate.

2. A stencil for lettering and the like, molded from synthetic resin, wherein metal guide strips are included during the molding; said guide strips being equipped with three ribs, the center rib being undercut and the outer surfaces of the outer ribs being chamfered in a direction toward said stencil plate; said stencil plate carrying, along each longitudinal edge, ribs so shaped as to fit into the spaces betwen the ribs upon the respective guide strips.

3. A stencil as claimed in claim 2, wherein the guide strips are comprised of a kneadable, non-elastic metal having the characteristics of deforming without resiliently returning to its original condition.

4. A stencil as claimed in claim 3, wherein said metal is aluminum.

5. A stencil as claimed in claim 3, wherein said outer ribs of said guide strip are bent toward each other for providing a good seal with said ribs of said stencil plate.

6. A stencil comprising a stencil plate, said stencil plate being molded from synthetic resin and having at least one integrally extending finger at at least one end thereof; a guide strip defining an edge of said stencil; said guide strip including at least two longitudinally extending ribs defining a cavity for the reception of said finger of said stencil plate; said longitudinally extending ribs including chamfered surfaces along outer edges thereof for developing a component of force along said stencil plate for forcing said stencil plate firmly into said cavity; said chamfered surfaces being tapered inward toward said stencil plate; said chamfered surfaces each being at an acute angle with respect to said stencil plate.

7. The stencil of claim 6, wherein said cavity is completely filled by said finger of said stencil plate whereby said finger and consequently said stencil plate is prevented from undesired motion with respect to said guide strip.

8. The stencil of claim 7, wherein interior surfaces of said longitudinally extending ribs are undercut such that portions of said finger are firmly retained under portions of said interior surfaces.

References Cited

UNITED STATES PATENTS

| | | | |
|---|---|---|---|
| 2,222,333 | 11/1940 | Wenzel et al. | 101—384 |
| 2,247,157 | 6/1941 | Little | 33—107 |
| 2,298,365 | 10/1942 | Gits et al. | 101—395 |
| 2,633,655 | 4/1953 | Langan | 101—127.1 |
| 3,296,673 | 1/1967 | Kirkpatrick | 101—415.1 |

FOREIGN PATENTS

| | | |
|---|---|---|
| 726,961 | 3/1955 | Great Britain. |
| 911,674 | 11/1962 | Great Britain. |

ROBERT E. PULFREY, *Primary Examiner.*

F. A. WINANS, *Assistant Examiner.*